United States Patent [19]

Tufte

[11] Patent Number: 4,706,100
[45] Date of Patent: Nov. 10, 1987

[54] HIGH TEMPERATURE HETERO-EPITAXIAL PRESSURE SENSOR

[75] Inventor: Obert N. Tufte, Prior Lake, Minn.

[73] Assignee: Honeywell Inc., Minneapolis, Minn.

[21] Appl. No.: 891,829

[22] Filed: Aug. 1, 1986

[51] Int. Cl.[4] .......................................... H01L 29/161
[52] U.S. Cl. ...................................... 357/16; 357/26; 357/55; 338/2; 73/727; 73/777
[58] Field of Search ............... 357/26, 16, 55; 73/727, 73/777; 338/2, 42

[56] References Cited

U.S. PATENT DOCUMENTS

| | | | |
|---|---|---|---|
| 4,003,127 | 1/1977 | Jaffe | 357/26 |
| 4,054,497 | 10/1977 | Marshall | 204/129 |
| 4,503,709 | 3/1985 | Ruhle | 73/727 |
| 4,510,671 | 4/1985 | Kurtz | 357/26 |
| 4,551,394 | 11/1985 | Betsch | 357/16 |
| 4,654,621 | 3/1987 | Sugiyama | 338/2 |

FOREIGN PATENT DOCUMENTS

| | | | |
|---|---|---|---|
| 57-159067 | 10/1982 | Japan | 357/26 |
| 60-97677 | 5/1985 | Japan | 357/26 |

Primary Examiner—Martin H. Edlow
Assistant Examiner—Mark Prenty
Attorney, Agent, or Firm—Omund R. Dahle

[57] ABSTRACT

A high-temperature hetero-epitaxial piezo-resistive pressure sensor in which an epitaxial layer of a wide-bandgap semiconductor such as GaAs is grown onto a silicon wafer and the piezoresistors are implanted into the wide-bandgap layer.

10 Claims, 3 Drawing Figures

SILICON MATERIAL REMOVED BY ETCHING

HIGH TEMPERATURE HETERO-EPITAXIAL PRESSURE SENSOR

BACKGROUND AND SUMMARY OF THE INVENTION

The field of the invention is piezoresistive pressure sensors.

Prior art silicon piezoresistive pressure sensors are made by etching thin diaphragms into the monocrystalline silicon. Piezoresistors are implanted into the silicon and because of the large piezoresistive effect in the silicon a good pressure sensor results. Such sensors have proven to be excellent low cost, high performance devices and are completely satisfactory where operating temperatures remain no higher than about 150° C. One example of the prior art is the disclosure of U.S. Pat. No. 4,054,497.

In certain applications of piezoresistive sensors operating temperatures will be in the range above 150° C., for example up to about 200°-250° C. The silicon device cannot operate at these elevated temperatures because the transducer performance degrades due to the limitations caused by the approximately 1 eV bandgap of silicon.

In the present invention to achieve higher temperatures, an epitaxial layer of GaAs is grown on a single crystal silicon structure and resistors are implanted into the GaAs layer. In this way the excellent mechanical properties of silicon as well as the chemical inertness of the Si/SiO2 surface is retained on the inside of the diaphragm while the piezoresistive sensing elements are formed in the larger bandgap semiconductor layer on the reverse side of the diaphragm which allow higher temperature operation.

DESCRIPTION

The use of the piezoresistive effect in silicon as the transducer basis for a pressure sensor is well known and such pressure sensors are widely used. Typically p-type conductivity resistor regions are formed in an n-type conductivity silicon layer so that the p-type regions become pn junction isolated resistors. By adding contacts and measuring the resistance between the contacts while pressure is applied to the diaphragm, the pressure or stress can be determined due to the piezoresistive effect.

Figure 1:
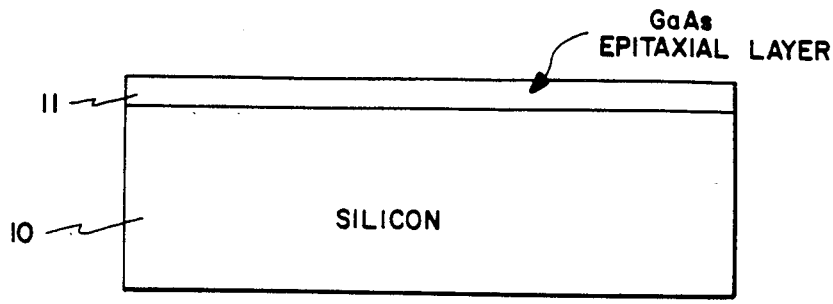
FIGS. 1, 2 and 3 are sectional views of the present invention in successive stages of fabrication. These sensor transducers may be batch fabricated over the entire surface of a wafer as shown in FIG. 3.
Figure 2:
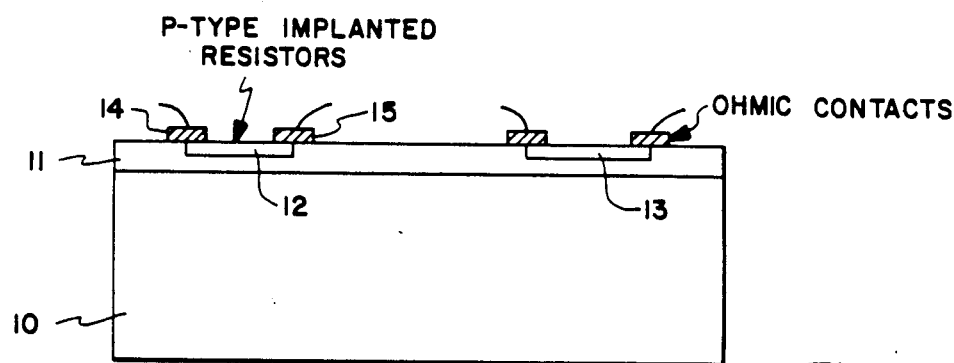
Figure 3:
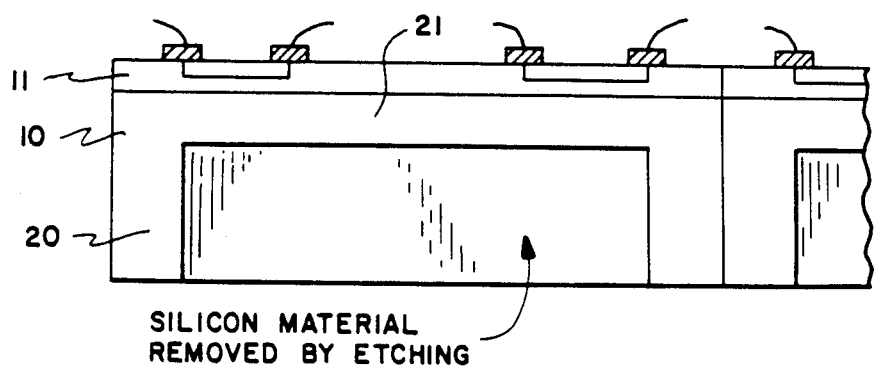

Referring now to FIGS. 1-3, not drawn to scale, it may be seen that a monocrystalline silicon substrate 10 is provided that has a thin film layer of a wide-bandgap semiconductor 11 epitaxially grown on the silicon. For one implementation, the orientation of the silicon wafer plane is in or near the <100> direction. This wide bandgap semiconductor may be, for example, n-type or semi-insulating GaAs or AlAs or AlGaAs. These wide-bandgap semiconductors in their epitaxial single crystal form exhibit large (large means piezoresistive coefficient $>50 \times 10^{-12}$ cm$^2$/dyne) piezoresistive effects when doped with p-type impurities in a manner similar to silicon. The thickness of the layer 11 may be, by way of example, about 1-2 microns. Using photolithography, p-type piezoresistors 12 and 13 are formed in the GaAs film 11 by diffusion or ion implantation and are oriented to be parallel or perpendicular to the <110> direction and form a 4-arm bridge in a manner analogous to silicon sensors. The ion implantation may be by way of example, to a depth of about ½-1 micron and with a concentration of doping level in a range of about $10^{17}$ to $5 \times 10^{19}$ atoms/cc. The implant source is preferably of beryllium, but other p-type impurities can be used. Low resistance ohmic electrical contacts 14 and 15 are made to these resistors 12 and 13 as shown in FIG. 2. While a single device is shown in FIGS. 1 and 2, the devices are preferably batch fabricated over the entire surface of a wafer as suggested in FIG. 3. Other crystallographic planes are also possible providing that high quality epitaxial layers can be formed on the silicon and the piezoresistors are oriented in crystallographic directions exhibiting large piezoresistance effects.

The silicon wafer 10 is then masked and etched to form a cup-like structure 20 with a diaphragm area 21 in this preferred embodiment, as shown in FIG. 3. Conventional isotropic or anisotropic etchants for silicon may be used. The resistors 12 and 13 are located in the remaining diaphragm area 21 at the base of the etched cup-like structure. The diaphragm remaining may be about 20 microns in thickness and includes the remaining silicon and the GaAs layer 11. The final thickness is determined by the pressure range over which the pressure sensor is designed to operate. Currently used processes for controlling the thickness of the silicon diaphragm can be utilized. Finally the sensor is connected to a pressure tube and packaged using conventional silicon pressure sensor processes.

A second embodiment for forming high temperature heterostructure pressure sensors is similar to the first but an etch is made entirely through the silicon 10 so that the pressure sensing diaphragm is the large bandgap semiconductor layer 11 and the thickness of the diaphragm is determined by the epitaxial layer thickness.

Any large bandgap semiconductor which has a suitable energy band structure to exhibit large piezo-resistance effects and which can be grown on silicon in a good quality heteroepitaxial layer can be used in these devices. Examples in addition to p-type GaAs (1.4 eV bandgap) include p-type Al$_x$Ga$_{1-x}$As alloys and n or p-type AlAs which are lattice matched to GaAs and allow bandgaps up to 2.1 eV and β-SiC which has a bandgap of 2.7 eV. When the epitaxial layer is Al$_x$Ga$_{1-x}$As and if x>0.5, then either n-type or p-type piezoresistive resistors may be utilized.

It is also possible to integrate the read-out electronics into the large bandgap semiconductor film in a manner similar to current practice in silicon pressure transducers. This has the advantage that the electronics will be located close to the sensing elements, and yet be able to operate at the high temperature of the sensor.

The embodiments of the invention in which an exclusive property or rights is claimed are defined as follows:

1. A high temperature hetero-epitaxial piezoresistive pressure sensor comprising:
   a single crystal silicon substrate, the silicon having a bandgap of about 1 eV;
   a thin-film epitaxial single crystal layer comprised of a wider bandgap semiconductor than said silicon substrate epitaxially grown on said silicon substrate, said semiconductor also being of a type having large piezoresistive effects;

diffused or ion implanted piezoresistive resistors in said wider bandgap semiconductor layer; and, a cup like depression in said substrate forming a diaphragm at the location of said piezoresistive resistors.

2. The sensor according to claim 1 in which the epitaxial layer is GaAs.

3. The sensor according to claim 2 in which the piezoresistive resistors are p-type and the epitaxial layer is semi-insulating or n-type.

4. The sensor according to claim 1 in which the epitaxial layer is $Al_xGa_{1-x}As$ where $0<x\leq 1$.

5. The sensor according to claim 4 in which the $x>0.5$ piezoresistive resistors are p-type.

6. The sensor according to claim 4 in which $x>0.5$ and the piezoresistive resistors are n-type.

7. The sensor according to claim 2 in which the GaAs layer is about 2 microns in thickness and in which the piezoresistive means are implanted into the GaAs layer to a depth of about 1 micron.

8. The sensor according to claim 1 in which the wider bandgap semiconductor layer is about 2 microns in thickness and into which the piezoresistive means are ion implanted to a depth of about 1 micron.

9. The sensor according to claim 1 in which the epitaxial layer has a piezoresistive coefficient $>50\times 10^{-12}$ $cm^2/dyne$.

10. A high-temperature hetero-epitaxial piezoresistive pressure sensor comprising:

a single crystal silicon substrate, the silicon having a bandgap of about 1 eV;

a thin-film epitaxial single crystal layer of $\beta$-SiC having a wider bandgap semiconductor than said silicon substrate epitaxially grown on said silicon substrate, said semiconductor also being of a type having large piezoresistive effects;

diffused or ion implanted piezoresistive resistors in said wider bandgap semiconductor layer; and, a cup like depression in said substrate forming a diaphragm at the location of said piezoresistive resistors.

* * * * *